United States Patent
Province

[11] 3,793,119
[45] Feb. 19, 1974

[54] FACING TOOL FOR PLASTIC PIPE FUSION APPARATUS

[76] Inventor: William F. Province, 2031 Dewey, Bartlesville, Okla. 74003

[22] Filed: Jan. 4, 1972

[21] Appl. No.: 215,359

[52] U.S. Cl.................. 156/499, 82/4 C, 156/258, 156/304, 156/535
[51] Int. Cl............................................. B23b 3/22
[58] Field of Search ... 156/258, 267, 304, 499, 502, 156/510, 511, 516, 517, 544; 82/4 C; 90/14, 21

[56] References Cited
UNITED STATES PATENTS

| | | | |
|---|---|---|---|
| 3,552,265 | 1/1971 | Lucas | 156/258 |
| 3,400,030 | 9/1968 | Burger | 156/535 |
| 3,013,925 | 12/1961 | Larsen | 156/499 |

*Primary Examiner*—Alfred L. Leavitt
*Assistant Examiner*—Caleb Weston
*Attorney, Agent, or Firm*—Head & Johnson

[57] ABSTRACT

This invention describes an improved plastic pipe facing tool for use in pipe fusion joining apparatus. The novelty lies in the design of the rotating portion of the tool by means of which the ends of two pipes, pressed inward against the rotating means, are faced to square ends, which later will be heated by a heating means to a temperature at which the plastic is fluid, and by pressing the two heated ends together the pipe will be joined.

The pipe facing tool comprises an annular frame inside of which is supported a rotating means, comprising two parallel circular plates and an annular ring sprocket. The three parts are spaced with washers and bolted together to provide a relatively thin rotating structure with cutting blades on the outside surfaces. Rollers are provided on the frame which fit into grooves which are cut into the inner surfaces of the two plates and the rotation of the cutting means is guided by those circumferential rollers. By this means of circumferential support of the rotating means the rotating cutter blades can be placed much more closely together than is possible in conventional design. A driving sprocket is mounted on the frame and chain means connects the driving sprocket to the sprocket on the rotating cutter means.

5 Claims, 4 Drawing Figures

PATENTED FEB 19 1974 3,793,119

FACING TOOL FOR PLASTIC PIPE FUSION APPARATUS

BACKGROUND OF THE INVENTION

This invention is in the field of plastic pipe working tools. More specifically, it is concerned with a tool which is used to simultaneously machine the ends of two plastic pipes which are clamped coaxially and spaced apart by the width of the cutting means.

With the advent of the increased usage of plastic pipe in various industries, such as the petroleum industry, there has been need for apparatus to hold two lengths of pipe rigidly together in a coaxial spaced position, with means to rotate cutters against the ends of both pipes. The cutter means is then removed and a heating plate is placed between the two pipe ends, which are moved closer together to be in heat transferring contact with the plate. When the surfaces of the two ends of the pipe are heated to a temperature such that the plastic is in a semi-fluid condition the pipes are separated, the heating plate is withdrawn, and the pipes are then pressed together in pressure contact, whereby the softened plastic of each pipe joins with the other to form a joint which is as strong as the original pipe.

One of the problems in the prior art is that the rotating means that carries the cutters to simultaneously prepare the two ends of pipe is of considerable axial dimension. This requires that the entire tool have a large range of axial motion of one of the two clamps that carries the shortest length of pipe. By reducing the axial width of the cutter assembly, the entire device can be shortened and less power and elapsed time is required to move the length of pipe during the machining, heating and joining steps. It is therefore a principle objective of this invention to provide a plastic pipe facing tool in which the axial width between the cutting surfaces is of minimum dimension.

SUMMARY OF THE INVENTION

The limitations of the prior art devices are overcome and the objectives are furthered by the embodiment of this invention, which includes a rotating cutter blade assembly which is of very much less axial dimension than the prior art devices.

Existing prior art facing tools generally have a shaft which is positioned on the axis of the pipes. Two support walls are provided, with bearings, to support the shaft. Two plates, on either side of the support arms that carry the cutting blades are placed on the shaft outside of the arms. Thus the overall width of the cutting assembly includes the width of the two blades and of hubs on these plates for attachment to the shaft, plus the axial length of the two bearings which are in the support arms, plus the sprocket and the hub for attaching the sprocket to the shaft.

In this invention the design is such that there is no axial shaft, and thus no hubs for attachment, to the shaft, of the outside cutting plates and the sprocket. In this design the rotating assembly comprises the two cutting plates and the central sprocket which are clamped together as a rotating unit with a minimum spacing between the sprocket and the two plates. Circular grooves near the outer edges of the discs on their inner faces, provide two outer rims, which are supported by two sets, each of a plurality of rollers, which are mounted on an annular support frame which surrounds the rotating cutting assembly. Since the support of the rotating assembly is on circumferential surfaces there is no need for long, rigid supporting arms and bearings to support a shaft, nor for the hubs required to attach to the shaft the sprocket and the two cutting plates, as in prior devices. Thus the axial thickness of the assembly can be reduced to one-half or less of the conventional thickness. This simplifies and reduces the cost of the cutting assembly, and provides a reduced overall dimension to the entire tool, and to the range of movement required in the clamping means which holds one of the two pipes to be joined.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 1:
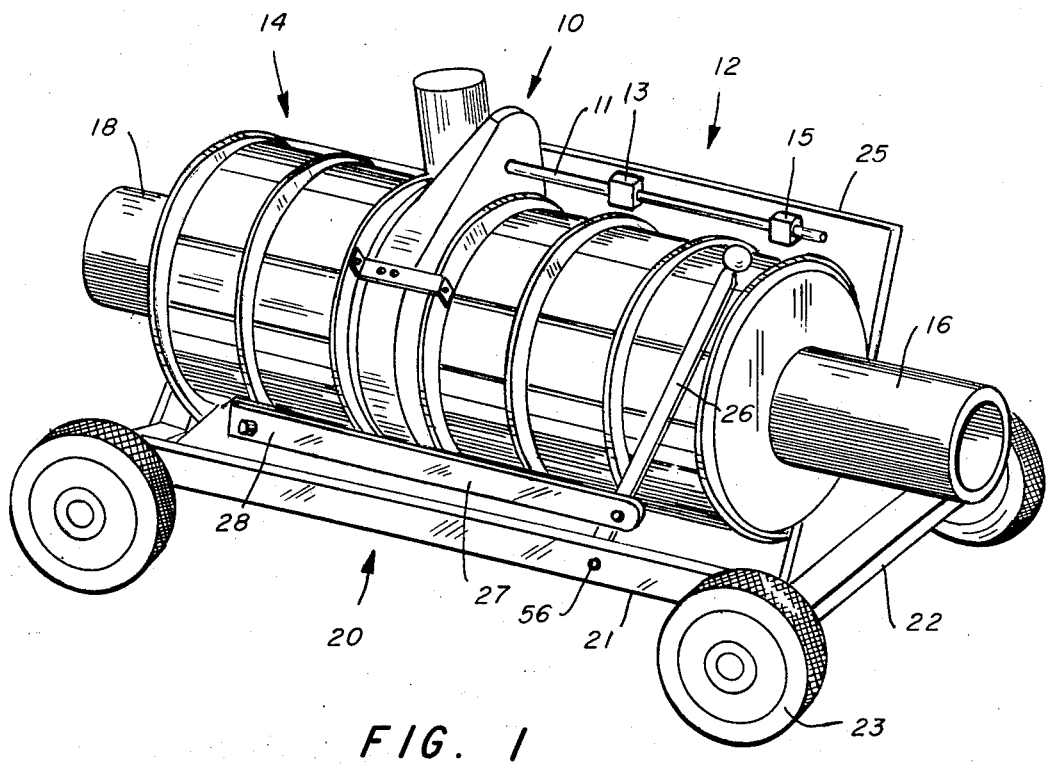
FIG. 1 represents an overall view of the pipe fusion apparatus.

FIG. 1 represents an overall perspective view of a fusion type pipe joining apparatus, in which the pipe facing means of this invention is used to machine the opposed ends of each of the two pipes that are to be joined in the fusion process. The pipe facing apparatus is indicated generally by the numeral 10. Numeral 12 indicates a pipe clamping apparatus by means of which one of the pipes shown as 16 is held rigidly in place. The numeral 14 indicates generally a second pipe clamping device which is used to hold the new length of pipe, identified as numeral 18. The clamping means 14 is mounted by means, not shown, so that it can slide longitudinally along the frame shown generally as numeral 20, so that the pipe 18 can be separated from, or brought closer to, the pipe 16 which is clamped in the clamp means 12 which is fastened, by means not shown, securely to the frame 20. The frame 20 can conventionally be made of longitudinally and transverse members 21 and 22 with wheels 23, as is common practice.

Means are provided for traversing the movable clamp 14. These can conveniently be a lever 26 rotatable about pivot 56 attached to frame member 21, and an operating arm 27 connected to the block 28 attached to movable clamp 14. By the use of lever 26 movable clamp 14 and pipe 18 can be precisely positioned with respect to pipe 16.

In the course of joining plastic pipe by the fusion method, the two opposed ends of the pipes 16 and 18 are machined so that the faces are perpendicular to the axis of the pipes. The cutting device 10 is used for this purpose, when the ends of the pipe are machined, the cutter is then removed from the gap between the pipes and is replaced by a heating means which has a heating element and two parallel surface plates which can be maintained at any selected temperature. This heating means is generally considerably narrower, or thinner, than is the cutting device and when it is placed between the pipes, clamp means 14 and pipe 18 must be moved closer to pipe 16. Pressure of the pipes against the hot surfaces of the heating means raises the temperature of the pipe material to a selected temperature, at which temperature the plastic becomes fluid enough so that when the pipes are temporarily separated again and the heating means removed from between the pipe ends, the pipes can then be brought together by moving the clamp 14 and considerable pressure can be provided to press the two pipe ends into contact, whereby the plastic material of each pipe intermixes to provide a solid joint between the two lengths of pipe.

Figure 4:
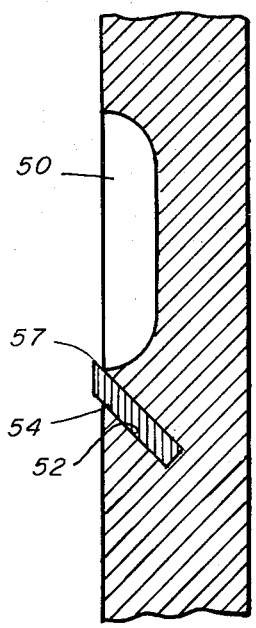
FIG. 4 shows in section a view taken along the line 4—4 of FIG. 2.
Figure 3:
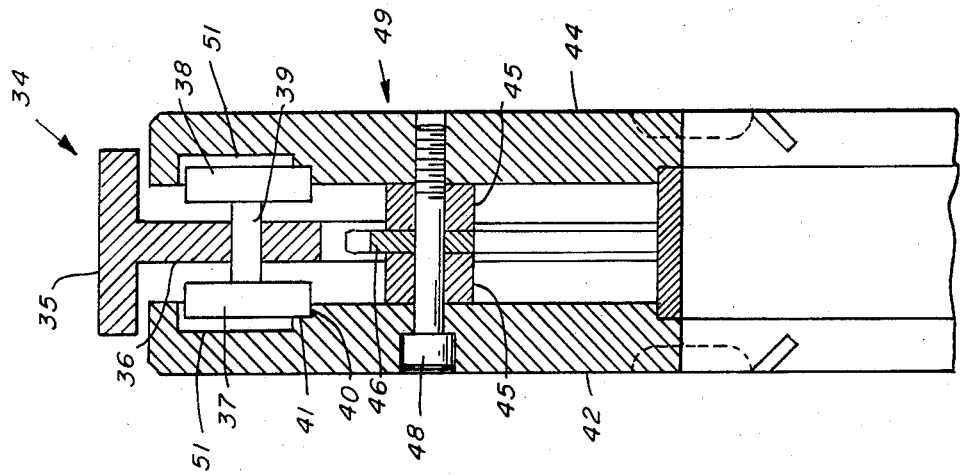
FIG. 3 shows in section a view taken along the line of 3—3 of FIG. 2.
Figure 2:
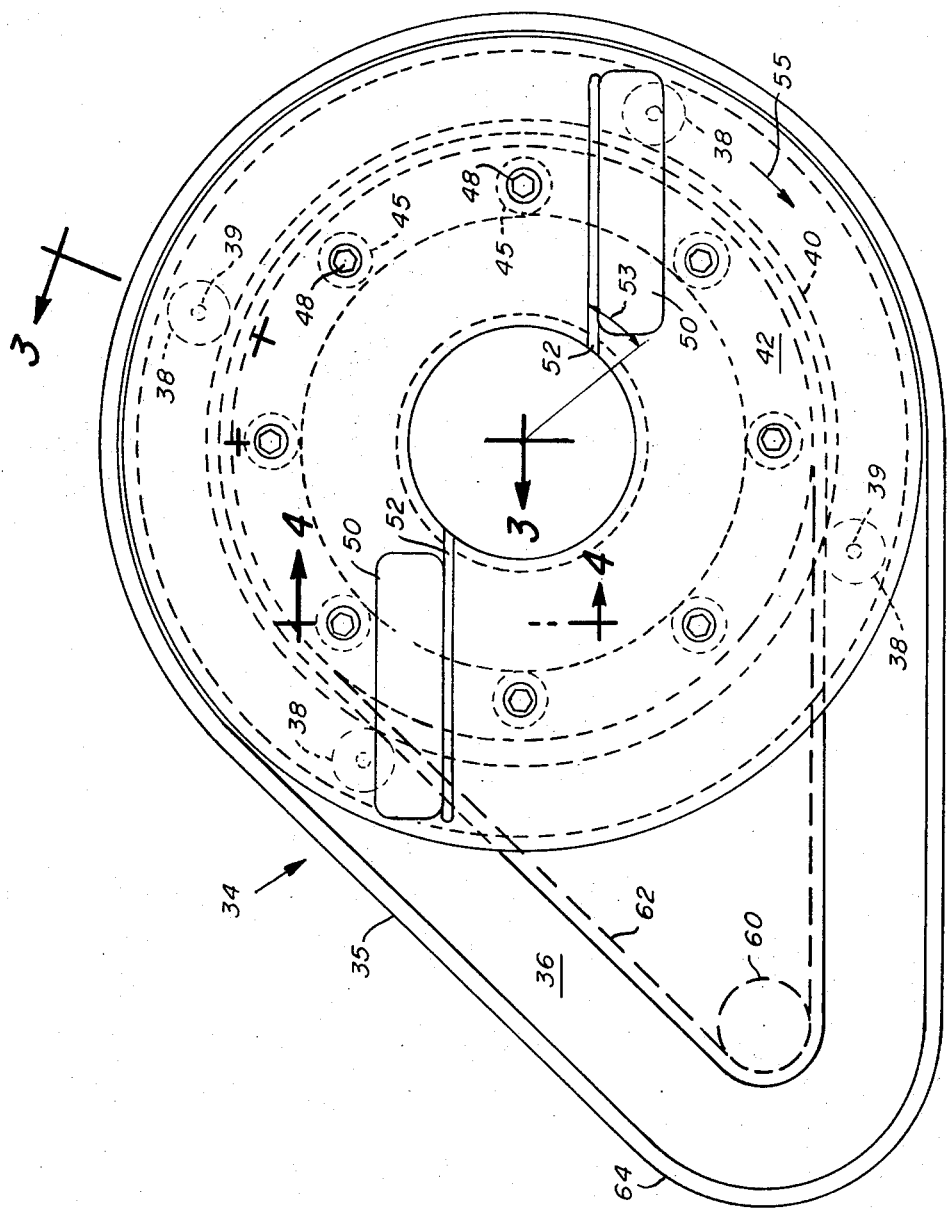
FIG. 2 provides an elevation view of one side of the facing tool.

While there are a number of features of this design of the overall fusion apparatus that may not be shown in prior art devices, the claims of this invention will be directed only to the cutting device, shown as numeral 10. Thus, further description will be limited to the details of the pipe facing means, as shown in FIGS. 2, 3, and 4.

A frame shown generally by the numeral 34 is formed into a circular portion and an angular portion as shown. The frame may be cast, forged or formed of a rolled section in the form of a tee where the tee is essentially an annular plate and is supported and made rigid by a short cylinder, the two parts together forming in cross section the shape of the letter T. Mounted on the inner web of the frame are a plurality of shafts 39 which support rollers 37 and 38. There may be three or four or more of these shafts 39 supported on the web, so that the surfaces of the rollers will define an inscribed circle.

The rollers support a rotating assembly indicated generally by the numeral 49. This comprises a first circular plate 42, a similar second circular plate 44, an annular sprocket 46, which is clamped axially between the two plates 42 and 44 by means of spacers 45 and a plurality of bolts 48. There is a circular groove 51 cut into the inner surface of each of the two plates 42 and 44. These circular grooves provide circumferential surfaces 40 which form angles with lips 41. The rollers are contacted in these annular contacts between the circumferential rims 40 and the lips 41, one set of rollers for plate 42 and the other for plate 44. In this manner, the assembly 49 can be rotated freely, being rigidly supported by the series of rollers 37, 38 on each side of the central web 36 of the frame 34.

It will be clear, of course, that the annular portions of the discs out beyond the lips 41 could be cut away, since they do not support the rotating assembly. However, as will be shown later, they do support part of the cutting blade system. Also they serve to keep dirt and chips out of the roller bearings.

On the portion 64 of the frame 35 there are means to support a welded plate and a shaft (not shown) which carries a drive sprocket 60 and a motor (not shown) coplanar with the main sprocket 46, and a chain 62 which joins the drive sprocket 60 and the main sprocket 46 on the rotating assembly 49.

Each of the two plates 42 and 44 has on its outer surface means for rigidly attaching cutting blades 54, better shown in FIG. 4. Slots 52 are cut, preferably at an angle, as shown in FIG. 4, in a direction illustrated in FIG. 2.

The cutting blade 54, is a piece of tool steel of rectangular shape and of such width that it can be readily placed in the slots 52. The cutting edge 57 of the blade is cut back, as shown, to provide the proper cutting conditions as is well known in the art. Appropriate means (not shown, but well known in the art) are provided to hold the blades 54 securely in the slots 52.

Referring back to FIG. 1, an example of one means of supporting facing tool 10 is illustrated. A shaft 11 is supported in bearings 13 and 15 which are mounted on a plate 25 supported from the frame 20. The shaft 11 is parallel to the axis of the pipes and is attached perpendicular to the frame 34 of the facing tool, thus the facing tool can be rotated about the shaft 11 out of the gap between the two pipe ends. When it is out of the gap, a heating element, not shown, (but well known in the art) can be inserted into the gap, as was explained earlier. When the clamp 14 and pipe 18 are moved to the left, the cutting assembly 10 can be rotated into position where the cutting surface is coaxial with the pipe 16. In this position the cutting blades will be spaced away from both pipes 16 and 18. As the clamp 14 and pipe 18 are moved to the right, the pressure of the end of the pipe 18 on the face 42 of the cutting assembly pushes it to the right, as the shaft 11 moves in the bearings 13 and 15 to the right. As it does so, the face 44 of the cutting assembly contacts the end of the pipe 16. Further movement of clamp 14 presses the pipe 18 on to one cutting face and the second cutting face is pressed against the end of the pipe 16. Thus, as the cutting assembly is rotated, the pipes are faced off together, to be perpendicular to the axis of the pipes. When the cutting operation is completed the clamp 14 is moved to the left carrying the pipe 18 with it. The cutting assembly 10 is rotated out of the gap. The heating step is then carried out and the fusion step is completed.

The mechanism illustrated, including parts 11, 13 and 15 for supporting and handling the facing tool is only one of many possible systems, and forms no part of this invention. It can be seen that the facing tool may, for example, be placed between or removed from between the adjacent end of the pipe by hand.

It is clear that by supporting the rotating assembly 49 on its circumference rather than by its axis, it is possible to simplify materially the frame which holds the rotating assembly, and to narrow the rotating assembly to a thickness which is less than one-half of what is customarily provided in those prior art devices which use a rotating shaft to support the cutting assembly.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a plastic pipe fusion apparatus for joining the ends of two coaxial, spaced, plastic pipes of the same diameter including a frame, a stationary clamp to hold a first pipe, a movable clamp to hold a second pipe and to traverse it longitudinally from a position where it is separated from to a position where it is in pressure contact with the first pipe, and a heating means to heat the opposed ends of the pipes, the improvement in plastic pipe facing tool means for machining the opposed ends of said pipes, comprising:

a. a frame having a vertical portion supporting a plurality of pairs of spaced apart, coaxial rollers, said rollers defining an inscribed circle;

b. rotating means including a pair of parallel spaced plates with facing coaxial rims, the outside surfaces of the rims being in tangential contact with said pairs of rollers whereby said rotating means is rotatably supported on said rollers;

c. cutting blade means supported on the two outer paralleled surfaces of said pair of plates;

d. means between said pair of plates for rotating said rotating means and means to removably position said pipe facing means in the gap between said pipes with its plane normal to the axis of said pipes, and including means for limited axial travel of said pipe facing means.

2. The facing tool means as in claim 1 in which at least a portion of said frame comprises a T section formed into a circle with the flange on the outside, the stem of the T forming said vertical portion on which said rollers are supported.

3. The facing tool means as in claim 1 in which said rotating means comprises a pair of plates clamped in parallel axial position with a first chain sprocket coaxially mounted therebetween, said rims formed by circular grooves machined into the inner faces of said plates.

4. The facing tool means as in claim 3 and including drive sprocket means on said frame, and chain means between said first sprocket and said drive sprocket.

5. In a plastic pipe fusion apparatus for joining the ends of two coaxial, spaced, plastic pipes of the same diameter including a frame, a stationary clamp to hold a first pipe, a movable clamp to hold a second pipe, and to traverse said second pipe longitudinally from a position where it is separated from, to a position where it is in pressure contact with, said first pipe, and a heating means to heat the opposed ends of the pipes, the improvement in plastic pipe facing tool means for machining the opposed ends of said pipe, comprising:

a. a frame comprising a circular portion formed with a T section with its flange on the outside and the stem of the T on the inside and including a plurality of rollers supported on the stem of the T, said rollers defining an inscribed circle;

b. a rotating means supported in said frame, said rotating means comprising a pair of parallel circular plates spaced apart with a chain first sprocket clamped centrally between the plates, said plates and sprocket coaxial, the inner surfaces of said plates with machined grooves which define circumferential rims, the outer surfaces of which are in rotating contact with said rollers;

c. drive sprocket means and chain means in said frame for driving said rotating means by said first sprocket;

d. cutting blade means adjustably mounted on the outer surfaces of said rotating means, said blade means adapted to cut the ends of said pipes when said rotating means is placed in contact with the ends of said pipes; and e. means to removably position said pipe facing means in the gap between said pipes with its plane normal to the axis of said pipes and including means for limited axial travel of said pipe facing means;

whereby when said pipe facing means is in said gap and said second pipe is moved toward said first pipe, the end of said second pipe will be in cutting contact with a first cutting means on a first surface of said rotating means, and, by pressure, on said rotating means will move said pipe facing means axially until the second cutting means on the second surface of said rotating means is in cutting contact with said first pipe.

* * * * *